May 31, 1938.  C. L. KELLER  2,119,278
LINED OR COMPOSITE BATTERY BOX AND THE LIKE
Filed Oct. 31, 1934
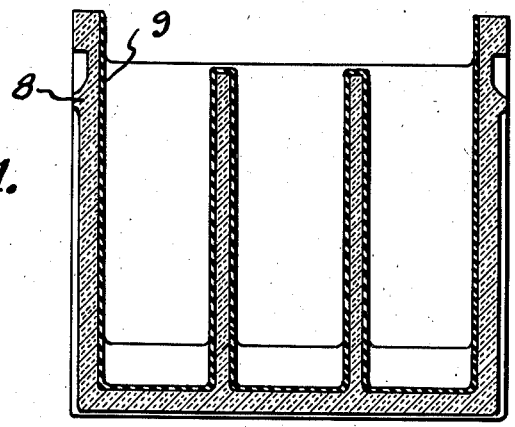
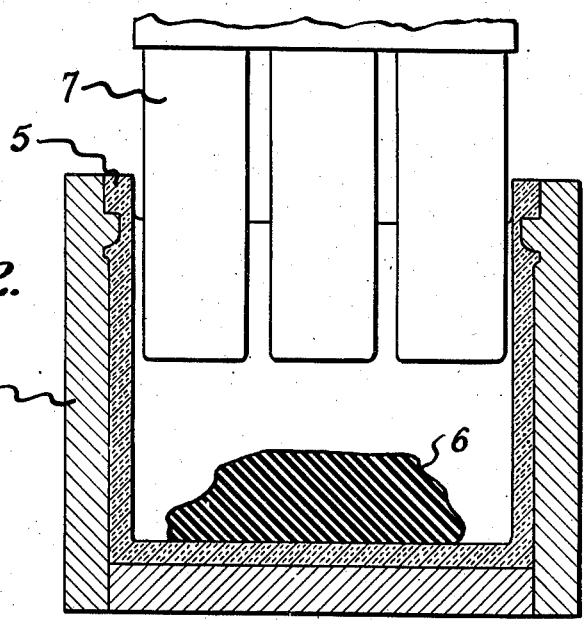
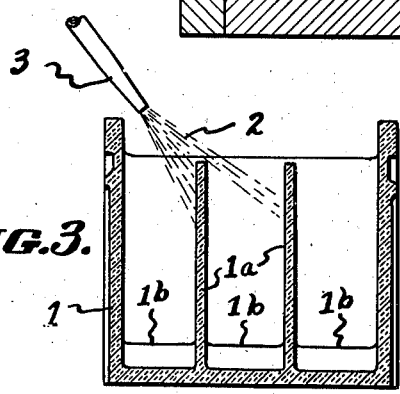
INVENTOR.
CHARLES L. KELLER.
BY Allen & Allen
ATTORNEYS.

Patented May 31, 1938

2,119,278

UNITED STATES PATENT OFFICE 2,119,278

LINED OR COMPOSITE BATTERY BOX AND THE LIKE

Charles L. Keller, Cincinnati, Ohio, assignor to The Richardson Company, a corporation of Ohio Application October 31, 1934, Serial No. 750,863

5 Claims. (Cl. 206—2)

My invention relates to the production of composite or lined molded articles and I shall describe it in connection with the production of storage battery cases as being an exemplary field of utility therefor, not however limited.

It is the commercial practice today to make by far the greater number of storage battery cases of a composition comprising a bituminous binder, an acid resistant mineral filler and an organic fiber. Such battery cases have been long in service and have given excellent results. My invention may be applied to storage battery cases of this type, as will hereinafter be set forth. In some instances it is desirable to retain the advantages of the physical characteristics and relative cheapness of molding compositions of this type, while producing an interior or exterior lining of a composition of a somewhat different type, having different physical, chemical or electrical properties. It may in some instances, be desirable for example, to form or coat the bottom plate retaining grids with a composition which may be harder, particularly at higher temperatures. It may in some instances be desirable to coat particularly the partition walls of such a structure with a material to prevent acid penetration, which is a phenomenon believed to be quite distinct from the matter of acid resistance.

It is a general object of my invention to provide an improved process of making lined containers or molded articles and novel lined articles as such. The ancillary objects of my invention will be pointed out hereinafter or will be apparent to one skilled in the art upon reading these specifications, wherein I shall describe in detail certain forms of the exemplary embodiment hereinabove referred to, and the process which I employ in making them. Reference is made to the drawing wherein:

Figure 1 is a sectional view of a composite storage battery container.

Figure 2 illustrates a mechanism which may be employed in producing a lined article by a molding process.

Figure 3 shows the operation of spraying an article to form a lining therein.

I shall describe my invention in connection with the provision of storage battery cases of asphaltic composition having a lining therein of vulcanized rubber for the purpose described. It should be understood however, that my invention is not limited to these particular compositions. The lining material may be hard or soft rubber or rubber compositions with or without fillers, artificial or natural curing or non-curing resins, oily or waxy ingredients, etc. In general, my application is of utility with and is directed to the whole range of moldable plastics, preferably though not necessarily, of the non-setting type for the main body of the container or article, and the whole range of plastics, preferably though not necessarily, of the setting variety for the lining substance.

It will be seen in the manufacture of a bituminous storage battery case lined with the vulcanized rubber compositions, I first form by the ordinary pressure molding steps, a storage battery container of suitable type. Since ordinarily it will be desired only to form the lining on the inside of the container, the outside portions thereof may be completely formed and finished in the first operation, though this will not necessarily be so, if a coating is desired upon both sides. The interior portions of the box will ordinarily be formed by a male plunger or plunger combination which is somewhat oversize depending, of course, upon the thickness of the lining desired. If a very thin lining is desired the box may be formed and finished exactly as is the usual practice for boxes of the type and style chosen and with the same mechanism, since there is usually play enough in such boxes between the side and end walls, the partitions and the plates to permit of the introduction of the lining without substantial change in dimensions. A very thin lining will be sufficient where it is desired, for example, merely to protect the walls and partitions of the box from acid penetration during the stage of breaking in the storage battery after assembly, usually referred to as "forming". Where thicker coatings are desired, the mandrel will preferably be oversize, and for more elaborate structures, where, for example, it is desired to form a thick coating on the interior side and end walls of the box, and to form the partitions and the bottom grids entirely of the lining substance, my practice will be to use not only an oversized plunger, but a plunger which is solid and does not have the partitions and grid forming spaces therein.

The box thereafter is then treated in one of several ways to line it with the lining composition. Where vulcanizable rubber is to be employed, one method of doing this is illustrated in Figure 3, where I have shown the box 1 being spray coated with the lining substance as at 2, from a nozzle 3. The spray coating substance in this particular instance will preferably be a rubber latex capable of being sprayed. The latex will also preferably contain vulcanizing substances, and such fillers as may be desired. Care will be taken in the spraying to coat all of the interior surfaces relatively thinly but completely, with the coating substance. A plunger corresponding to the interior configuration of the box but being smaller than the interior of the box by the desired thickness of the coating, may then be introduced into the box before the emulsion has set and while it is still fluid. This will tend in part to spread the emulsion and in part to mold it in a thin layer over the interior portions of the battery case. Where a thin coating is desired, it will be the practice as I have indicated hereinabove, to mold the box complete with partitions and grids, and I have indicated partitions at 1a in Figure 3, and grids at 1d. Upon the insertion of the plunger and the molding of the lining or coating, steam or other heating fluid, may be introduced into the plunger, or the plunger may be heated directly so as to first break the emulsion and produce a coagulation of the rubber ingredients therein by drying out the water, and second to vulcanize the rubbery coating in place, and while its shape, thickness and configuration are maintained by the plunger. After the vulcanization has been completed, the plunger may be withdrawn and the article is finished.

For many uses however, particularly where a thin but continuous coating may economically be placed in or on the molded article, by spraying, swabbing, dipping or the like, a separate molding step will not be necessary. The box of Figure 3 may be sprayed as described and the emulsion allowed to dry on the interior and/or exterior walls thereof, after which the rubber may be vulcanized by dipping the container in a bath of hot fluid such as water, and without a separate lining molding step.

Another way of positioning the lining in the container is by molding it therein from a fluid or plastic mass. A convenient way of doing this will be described in connection with Figure 2, wherein I have shown diagrammatically the mold block or female portion of the mold at 4, in which the box 5, say of bituminous composition, has already been molded in a press by means of a plunger which is oversize, and which in this instance may be solid, and without provision for the formation of partitions or grids. A mass of lining plastic indicated at 6 may be placed in the already formed outer box or case 5, after the withdrawal of the first plunger. A second plunger of normal size indicated at 7, and of a shape to determine the interior configuration of the box including the partition walls and grids, may next be forced into the case or box 5, in the same or in a different press. The box 5 will preferably, though not necessarily, be allowed to remain in the mold block 4 during this step. The advisability of allowing it to remain in the mold block will be determined, both by operating considerations and by the stiffness of the plastic material 6. If the plastic material is very stiff, so that considerable strain during the molding operation would be placed upon the side, end and bottom walls of the case, it will obviously be preferable to allow the case to remain in the mold block 4. If the material or lining is one which becomes thinly plastic or fluid under molding conditions, it will be possible to carry on the second molding step without the necessity of the external retaining means for the case 5. It will be clear that during the second molding step, the case 5 acts as a matrix or female mold therefor. Instead of a plastic mass 6, powdered resins or other molding compositions may be employed, which become fluid under heat, or liquid substances having the power to set up into a condition to hold their shape upon proper treatment may likewise be used. For the plasticizing and/or curing steps, the plunger or plunger assembly 7 may be heated or cooled, or heated and cooled in succession. When the plunger is driven home into the case 5, the lining composition indicated at 6 is forced over the floor of the case 5, and up and about the interior portions of the walls thereof, and into any interstices in the plunger, such as those designed for the production of partition walls, plate sustaining grids and the like. When the second molding operation has been finished, the curing step, such as a vulcanization for rubber, or a heat treatment for a condensation resin, may be carried on in place as by control of the temperature of the plunger 7; or after the second molding operation, the plunger 7 may be withdrawn and the lined box cured as to its lining by a treatment carried on elsewhere, as with a separate plunger or by means of dipping in a bath, as hereinabove described.

It will be understood that my process can be applied to the formation of external linings as well as internal linings, or to the formation of both external and internal linings; and where I use the term "lining", it will be understood that I mean an external or internal coating or structural part which is distinguished from a structural part which might be referred to as the body. This has no necessary relationship however, to the thickness of the various structural parts since the lining (while ordinarily it will be thinner than the body portion), may, in parts or throughout, be as thick as the body portion, or thicker than the body portion. In making the container, for example, with an external lining, a body may be formed up in an under-sized matrix or female mold member, left on the molding plungers and used therewith as a molding plunger for molding a lining thereabout, in a separate and full-sized matrix, or mold block. It will be understood that linings may be formed both within and without a hollow body by a combination of the steps hereinabove recited, and by a series of more than two molding operations, changing both the male and female portions of the mold during the course thereof. Likewise my process is adaptable to the formation of a plurality of linings of the same or of different substances in succession.

I have illustrated in Figure 1 an exemplary article of the interiorly lined class made in accordance with my invention, and comprising an outer body 8, and an interior lining indicated at 9. The form and disposition of the interior lining may, as hereinabove set forth, vary in extent and thickness, and may merely cover the portions of an otherwise completely formed article, or may constitute portions of or configurations upon said article not otherwise formed in the body portion thereof.

Having thus described my invention what I claim as new and desire to secure by Letters Patent is:

1. A composition storage battery case comprising a body of bituminous composition and a liner of rubber, said liner and body being bonded together.

2. A molded storage battery case comprising a body of bituminous composition and a liner bonded thereto of vulcanized rubber.

3. A molded storage battery case comprising a body of bituminous composition and a liner of rubber molded in place and bonded thereto.

4. A molded storage battery case comprising a body of bituminous composition and a liner bonded thereto of polymerized resin.

5. A molded storage battery case comprising an outward box-shaped member of bituminous composition and an inner liner of rubber molded and bonded thereto, said inner liner comprising members forming cell partitions.

CHARLES L. KELLER.